United States Patent
Asai et al.

(10) Patent No.: US 11,716,508 B2
(45) Date of Patent: Aug. 1, 2023

(54) INFORMATION PROCESSING APPARATUS, SERVER APPARATUS, AND INFORMATION PROCESSING SYSTEM

(71) Applicant: NTT DOCOMO, INC., Chiyoda-ku (JP)

(72) Inventors: Kazuki Asai, Chiyoda-ku (JP); Yunsang Oh, Chiyoda-ku (JP); Ginpei Okada, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 111 days.

(21) Appl. No.: 17/422,526

(22) PCT Filed: Nov. 7, 2019

(86) PCT No.: PCT/JP2019/043654
§ 371 (c)(1),
(2) Date: Jul. 13, 2021

(87) PCT Pub. No.: WO2020/158094
PCT Pub. Date: Aug. 6, 2020

(65) Prior Publication Data
US 2022/0103898 A1    Mar. 31, 2022

(30) Foreign Application Priority Data
Feb. 1, 2019    (JP) .............................. JP2019-016761

(51) Int. Cl.
*H04N 21/442*    (2011.01)
*H04N 21/437*    (2011.01)
*H04N 21/24*    (2011.01)

(52) U.S. Cl.
CPC ... *H04N 21/44209* (2013.01); *H04N 21/2408* (2013.01); *H04N 21/437* (2013.01)

(58) Field of Classification Search
CPC ......... H04N 21/44209; H04N 21/2408; H04N 21/437; H04N 21/633; H04N 21/2402;
(Continued)

(56) References Cited

U.S. PATENT DOCUMENTS

| | | | | |
|---|---|---|---|---|
| 8,356,327 B2 * | 1/2013 | van Beek | ........... | H04N 21/2343 370/231 |
| 2013/0007263 A1 * | 1/2013 | Soroushian | ........ | H04N 21/2393 709/224 |

(Continued)

FOREIGN PATENT DOCUMENTS

| | | | |
|---|---|---|---|
| CN | 109218781 A | * | 1/2019 |
| JP | 2017-157958 A | | 9/2017 |
| JP | 2018-88598 A | | 6/2018 |

OTHER PUBLICATIONS

International Search Report dated Dec. 10, 2019 in PCT/JP2019/043654 filed on Nov. 7, 2019 (2 pages).

(Continued)

*Primary Examiner* — Robert J Hance
(74) *Attorney, Agent, or Firm* — Oblon, McClelland, Maier & Neustadt, L.L.P.

(57) ABSTRACT

An information processing apparatus includes a predictor configured to predict a throughput of a network, to generate a first predicted value indicative of the predicted throughput, an acquirer configured to acquire, from a server apparatus connected to the network, a second predicted value indicative of a throughput of the network predicted by the server apparatus, a selector configured to select a predicted value with higher prediction accuracy from among the first predicted value and the second predicted value X2, and a requester configured to request a distribution apparatus to transmit a video with a quality based on the predicted value selected by the selector 125.

3 Claims, 5 Drawing Sheets

(58) Field of Classification Search
CPC ......... H04N 21/23439; H04N 21/6581; H04N 21/8456; G06F 13/00
See application file for complete search history.

(56) References Cited

U.S. PATENT DOCUMENTS

| | | | | |
|---|---|---|---|---|
| 2015/0006621 | A1* | 1/2015 | Westphal | H04L 65/612 |
| | | | | 709/203 |
| 2018/0309809 | A1* | 10/2018 | Sen | H04L 65/80 |
| 2018/0314616 | A1* | 11/2018 | Savolainen | G06F 11/3442 |
| 2019/0222525 | A1* | 7/2019 | Dhanavath | H04L 47/822 |

OTHER PUBLICATIONS

Japanese Office Action dated Sep. 20, 2022 in Japanese Patent Application No. 2020-569383 (with unedited computer generated English Translation), 10 pages.

* cited by examiner

INFORMATION PROCESSING APPARATUS, SERVER APPARATUS, AND INFORMATION PROCESSING SYSTEM

TECHNICAL FIELD

The present invention relates to an information processing apparatus, a server apparatus, and an information processing system.

BACKGROUND ART

In recent years, video distribution services that distribute video over a network have become common. This type of video distribution service sometimes employs a method in which the bitrate of the video being distributed is dynamically changed depending on the communication status of the network. In the system described in Patent Document 1, a client apparatus that plays back the video predicts the communication status of the network. Furthermore, in the system described in Patent Document 2, a server apparatus connected to a network predicts the throughput of the network in a video distribution service.

RELATED ART DOCUMENT

Patent Documents

Patent Document 1: Japanese Patent Application Laid-Open Publication No. 2017-157958
Patent Document 2: Japanese Patent Application Laid-Open Publication No. 2018-088598

SUMMARY OF THE INVENTION

Problem to be Solved by the Invention

The throughput prediction accuracy of a server apparatus increases as more data is used in the prediction. In other words, if the amount of data used in the prediction is small, the throughput prediction accuracy of a server apparatus may be lower than the throughput prediction accuracy of a client apparatus. Therefore, in a method that only uses one of the throughput prediction by the client apparatus and the throughput prediction by the server apparatus, video quality may not be suitably set according to the communication status of the network.

Means of Solving the Problems

An information processing apparatus according to one aspect of the present invention is an information processing apparatus that receives a video transmitted by a distribution apparatus via a network, the information processing apparatus including a predictor configured to predict a throughput of the network, to generate a first predicted value indicative of the predicted throughput, an acquirer configured to acquire, from a server apparatus connected to the network, a second predicted value indicative of a throughput of the network predicted by the server apparatus, a selector configured to select a predicted value with higher prediction accuracy from among the first predicted value and the second predicted value, and a requester configured to request the distribution apparatus to transmit a video with a quality based on the selected predicted value.

A server apparatus according to one aspect of the present invention is a server apparatus connected to a network to which a distribution apparatus and a plurality of information processing apparatuses are connected, in which the distribution apparatus is configured to transmit a video, and each of the information processing apparatuses is configured to receive the video, the server apparatus including a collector configured to collect a plurality of logs from one of the information processing apparatuses, each log including information on playback of the video, a predictor configured to predict a throughput of the network based on the plurality of logs, to generate a predicted value indicative of the predicted throughput, and a transmission controller configured to cause a communication apparatus to transmit the predicted value to one of the information processing apparatuses.

An information processing system according to one aspect of the present invention is an information processing system having an information processing apparatus configured to receive a video transmitted by a distribution apparatus via a network and a server apparatus connected to the information processing apparatus via the network, in which the information processing apparatus includes a first predictor configured to predict a throughput of the network, to generate a first predicted value indicative of the predicted throughput, an acquirer configured to acquire, from the server apparatus, a second predicted value indicative of a throughput of the network predicted by the server apparatus, a selector configured to select a predicted value with higher prediction accuracy from among the first predicted value and the second predicted value, and a requester configured to request the distribution apparatus to transmit a video with a quality based on the selected predicted value, and the server apparatus includes a collector configured to collect a plurality of logs from the information processing apparatus, each log including information on playback of the video, a second predictor configured to predict the second predicted value based on the plurality of logs, and a transmission controller configured to cause a communication apparatus to transmit the second predicted value to the information processing apparatus.

Effect of the Invention

According to one aspect of the present invention, the information processing apparatus can select a predicted value with higher prediction accuracy from among a first predicted value predicted by the information processing apparatus and a second predicted value predicted by the server apparatus, which improves prediction accuracy of the throughput of the network compared to a case in which there are no options. As a result, the information processing apparatus can suitably select video quality according to the communication status of the network.

MODES FOR CARRYING OUT THE INVENTION

1. Embodiments 1-1. Summary of Information Processing System

Figure 1:
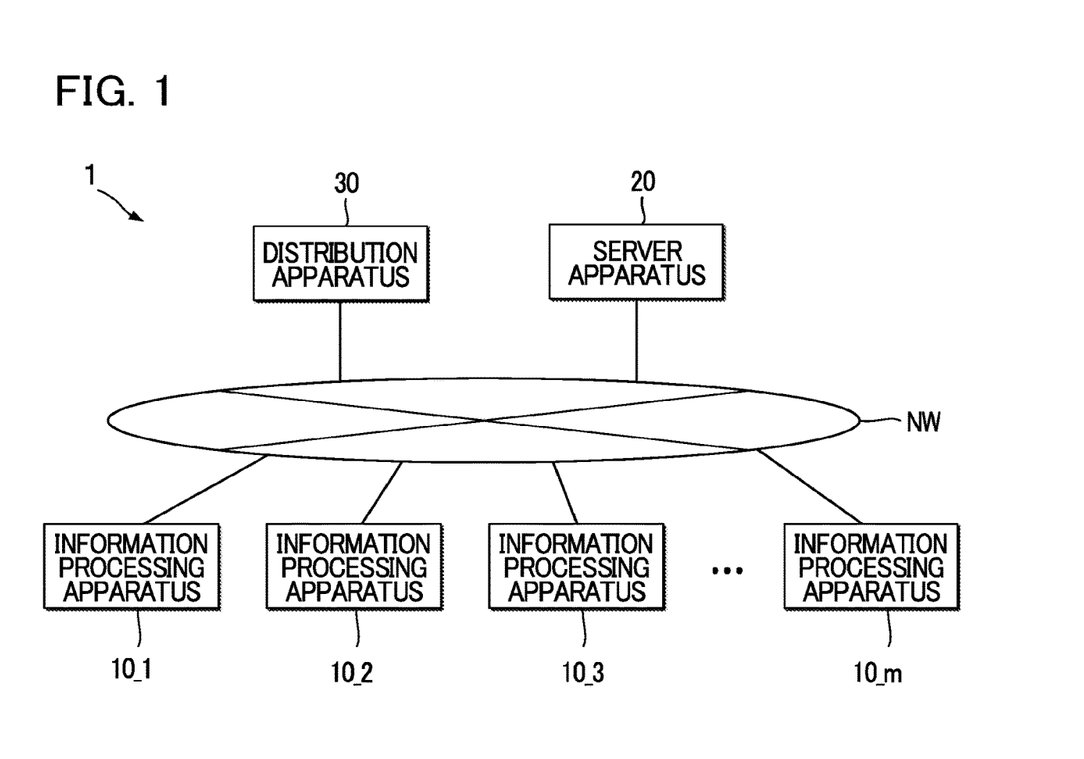
FIG. 1 is a block diagram showing an overall configuration of an information processing system according to an embodiment of the present invention.

FIG. 1 is a block diagram showing an overall configuration of an information processing system according to an embodiment of the present invention. The information processing system 1 shown in FIG. 1 provides a video distribution service. The video distribution service transmits, for example, films or broadcast content, to a user.

As shown in FIG. 1, the information processing system 1 includes information processing apparatuses 10_1 to 10_$m$ (where m is an integer greater than or equal to 1), a network NW, a server apparatus 20, and a distribution apparatus 30 that transmits a video. In the below description, when no distinction is made between elements of the same type, only the common number of the reference signs is used, such as the information processing apparatus 10.

The information processing apparatus 10 is an apparatus that processes various types of information. The information processing apparatus 10 is, for example, a portable information processing device such as a smartphone or tablet, etc. However, the information processing apparatus 10 may also be, for example, a stationary information processing device such as a personal computer, etc. The information processing apparatus 10 receives a video transmitted by the distribution apparatus 30 via the network NW. In addition, the information processing apparatus 10 predicts a throughput of the network NW to generate a first predicted value X1 indicative of the predicted result.

The server apparatus 20 is a so-called Quality of Experience (QoE) server. The server apparatus 20 predicts the throughput of the network NW to generate a second predicted value X2 indicative of the predicted result.

The distribution apparatus 30 transmits video data to the information processing apparatus 10 via the network NW. The video data is compressed by an encoder. In the transmission of video data related to one title, the video data is divided into a plurality of segments and is transmitted. One item of video data is transmitted in a number of periods corresponding to the number of divided segments. In response to a request from the information processing apparatus 10, the distribution apparatus 30 is able to transmit to the information processing apparatus 10 segment data of different quality for each period. The quality of the video is determined by image quality of the video such as resolution, framerate, and bitrate, the amount of data necessary for buffering, etc.

Figure 2:
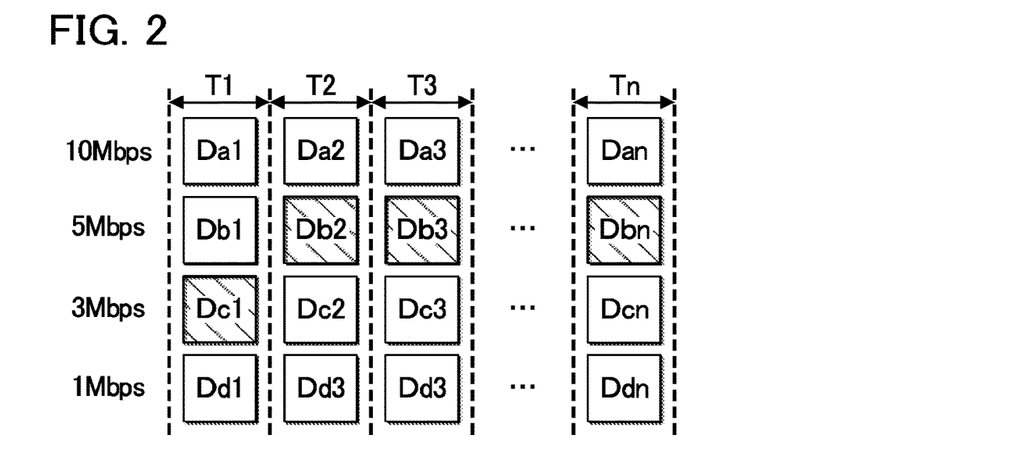
FIG. 2 is an explanatory drawing for explaining an example of video data.

FIG. 2 shows an example of video data. The example shown adopts the bitrate as the quality of the video. The information processing apparatus 10 is able to select one of the bitrates 10 Mbps, 5 Mbps, 3 Mbps, and 1 Mbps. For each bitrate, n segments (where n is an integer greater than or equal to 2) are prepared as video data. For example, n segment data Dc1, Dc2, . . . Dcn are prepared corresponding to the bitrate of 3 Mbps. In response to a request from the information processing apparatus 10, the distribution apparatus 30 is able to select one of the above bitrates for each of a plurality of periods T1 to Tn. For example, as shown by the shaded parts in FIG. 2, the distribution apparatus 30 transmits segment data Dc1 in period T1, segment data Db2 in periods T2 and T3, and segment data Dbn in period Tn to the information processing apparatus 10.

It should be noted that the number of distribution apparatuses 30 is not limited to 1. In addition, the number of server apparatuses 20 is also not limited to 1. For example, the information processing system 1 may include a plurality of information processing apparatuses 10, a plurality of server apparatuses 20, and a plurality of distribution apparatuses 30.

1-2. Information Processing Apparatus

Figure 3:
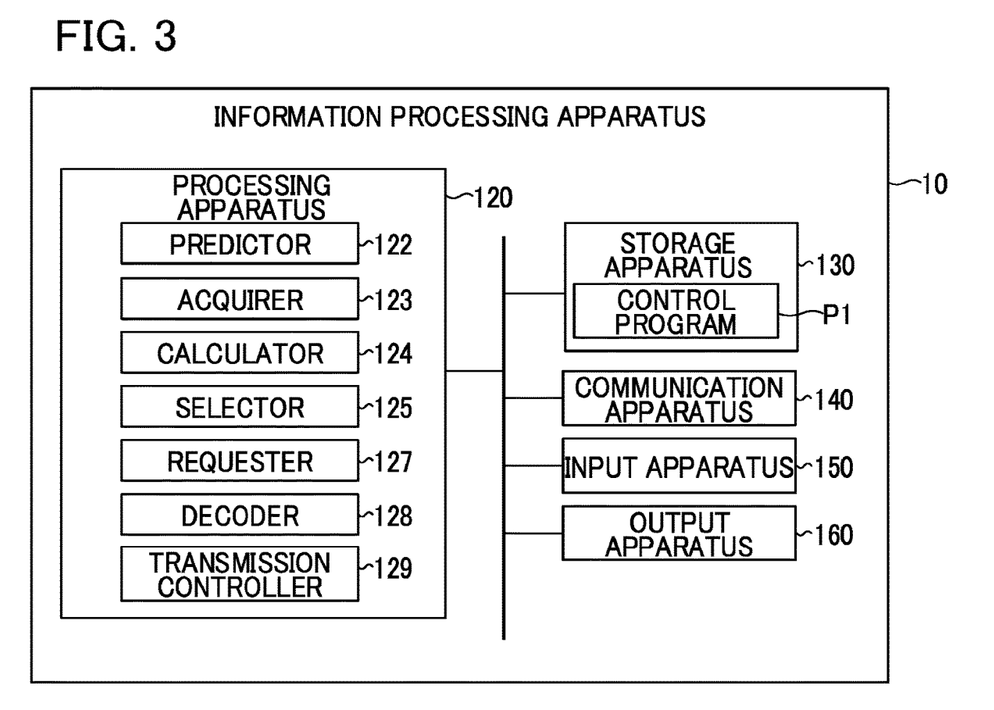
FIG. 3 is a block diagram showing a configuration example of an information processing apparatus.

FIG. 3 is a block diagram showing an information processing apparatus 10. The information processing apparatus 10 is realized by a computer system including a processing apparatus 120, a storage apparatus 130, a communication apparatus 140, an input apparatus 150, and an output apparatus 160. The processing apparatus 120, storage apparatus 130, communication apparatus 140, input apparatus 150, and output apparatus 160 are connected by a bus for transmitting and receiving information. The bus may be constituted of a single bus, or of different buses between apparatuses. Each element of the information processing apparatus 10 is constituted of one or more devices, and part of the elements of the information processing apparatus 10 may be omitted. Furthermore, in the present description, the term "apparatus" may be replaced with other terms such as "circuitry," "device," or "unit."

The processing apparatus 120 is a processor that controls the entirety of the information processing apparatus 10, and it is constituted of, for example, one or more chips. The processing apparatus 120 is constituted of, for example, a central processing unit (CPU) including an interface with peripheral devices, a computing device, and a register, etc. Some or all of the functions of the processing apparatus 120 may be realized by hardware such as a digital signal processor (DSP), an application specific integrated circuit (ASIC), a programmable logic device (PLD), or a field programmable gate array (FPGA). The processing apparatus 120 executes various processes in parallel or in sequence.

The storage apparatus 130 is a recording medium readable by the processing apparatus 120. The storage apparatus 130 stores programs including a control program P1 executed by the processing apparatus 120, and various data used by the processing apparatus 120. The storage apparatus 130 is constituted of, for example, a non-volatile memory and a volatile memory. Examples of non-volatile memories include a read only memory (ROM), an erasable programmable ROM (EPROM), and an electrically erasable programmable ROM (EEPROM). Examples of volatile memories include a random-access memory (RAM). The volatile memory included in the storage apparatus 130 is used as a working memory of the processing apparatus 120.

The communication apparatus 140 is a device that communicates with other apparatuses through a network NW such as a mobile communication network or the Internet. The communication apparatus 140 is also referred to as, for example, a network device, a network controller, a network card, or a communication module. The communication apparatus 140 is capable of communicating with the distribution apparatus 30 via the network NW.

The input apparatus 150 is a device for inputting information for using the information processing apparatus 10. The input apparatus 150 receives an operation input from a user. For example, the input apparatus 150 includes a microphone and a touch panel. The touch panel detects a touch on a display screen of a display apparatus. The touch panel receives operation inputs for inputting symbols such as numbers and letters based on a position of a touch, and for selecting an icon displayed by the display apparatus. The microphone converts the user's voice into an electrical signal and outputs an analog audio signal corresponding to the electrical signal. The audio signal is converted into a digital audio signal and provided to the processing apparatus 120 via the bus. The input apparatus 150 is not limited to a touch panel or to a microphone. For example, the input apparatus 150 may be a keyboard, a mouse, a switch, or a button, etc.

The output apparatus 160, under the control of the processing apparatus 120, notifies the user of various information. The output apparatus 160 includes, for example, a display apparatus and a speaker. The display apparatus displays an image. Various types of display panels, for example, a liquid crystal display panel or an organic electroluminescent (EL) panel, are suitably used as the display apparatus. The speaker is provided with audio data from the processing apparatus 120. The speaker includes a D/A converter. The D/A converter converts the audio data into an analog signal, and the analog signal drives the speaker.

By reading and executing the control program P1 from the storage apparatus 130, the processing apparatus 120 functions as a predictor 122, an acquirer 123, a calculator 124, a selector 125, a requester 127, a decoder 128, and a transmission controller 129.

Figure 4:
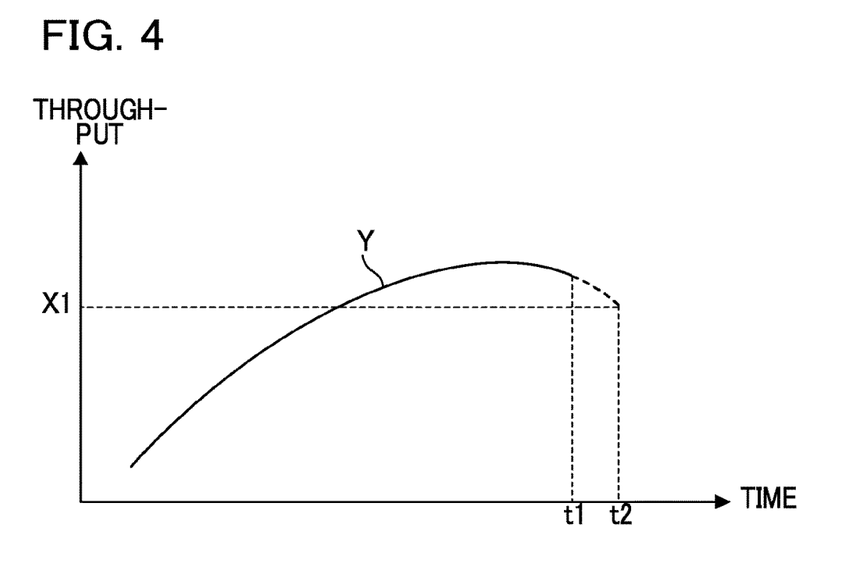
FIG. 4 is a graph explaining a first predicted value.

The predictor 122 predicts a throughput of the network NW, to generate a first predicted value X1 indicative of the predicted throughput. Throughput is a transmission amount of data per unit of time, and can be expressed in bps. The predictor 122 predicts the throughput of the network NW based on, for example, a measured value Y of a measured past throughput. For example, in a case in which the measured value Y changes as shown in FIG. 4, the throughput at time t2 predicted at time t1 will be the first predicted value X1, as shown in FIG. 4. The dotted line from t1 to t2 shown in FIG. 4 can be found, for example, by the method of least squares. The predictor 122 corresponds to the first predictor.

The acquirer 123 shown in FIG. 3 acquires, from the server apparatus 20 connected to the network NW, a second predicted value X2 indicative of a throughput of the network NW predicted by the server apparatus 20. More specifically, the acquirer 123 acquires the second predicted value X2 from the server apparatus 20 using the communication apparatus 140. The method of generating the second predicted value X2 by the server apparatus 20 will be described later.

The calculator 124 calculates the throughput of the network NW when the information processing apparatus 10 receives video data from the distribution apparatus 30, to generate a measured value Y indicative of the calculated result. Specifically, the calculator 124 calculates the throughput based on the transfer time and amount of transferred data, etc., in the data transfer between the distribution apparatus 30 and the information processing apparatus 10. As described above, the video data is divided into a plurality of segment data, and the video quality is controlled on a segment basis. One item of video data is transmitted in each of several periods T1 to Tn with a quality requested by the information processing apparatus 10. The calculator 124 calculates the throughput of the network NW when video data is received in each of the periods T1 to Tn, to generate the measured value Y indicative of the calculated results.

The selector 125 selects a predicted value with higher precision accuracy of the first predicted value X1 and the second predicted value X2. More specifically, the selector 125 compares a prediction error of the first predicted value X1 relative to the measured value of the throughput of the network NW with a prediction error of the second predicted value X2 relative to the measured value of the throughput of the network NW, and selects the predicted value with the smaller prediction error.

Figure 5:
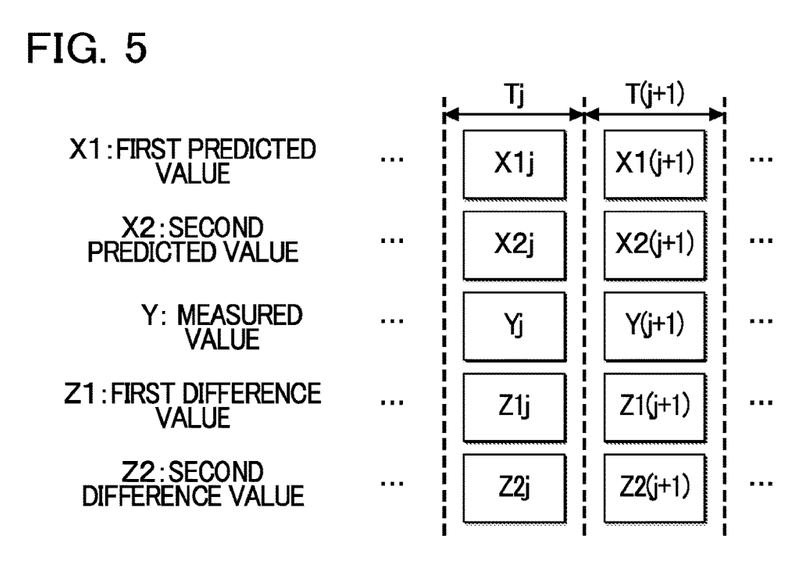
FIG. 5 is an explanatory drawing for explaining an operation of a selector.

FIG. 5 is an explanatory drawing for explaining an operation of the selector 125. For example, suppose that one item of video data is transmitted over several periods T1 to Tn. The selector 125 calculates a difference between a first predicted value $X1j$ and a measured value $Yj$ in a period (an example of a first period) Tj (where j is an integer that satisfies the relationship $1 \leq j \leq n-1$), which is one of the periods T1 to Tn, to generate a first difference value $Z1j$ which is the calculated result. In addition, the selector 125 calculates a difference between a second predicted value $X2j$ and the measured value $Yj$ in the period Tj, to generate a second difference value $Z2j$ which is the calculated result.

The first difference value $Z1j$ is the prediction error of the information processing apparatus 10 in the period Tj. The second difference value $Z2j$ is the prediction error of the server apparatus 20 in the period Tj. Based on the result of the comparison of the first difference value $Z1j$ with the second difference value $Z2j$, the selector 125 selects one of a first predicted value $X1(j+1)$ or second predicted value $X2(j+1)$ in the next (immediately following) period $T(j+1)$ (an example of a second period) after period Tj. Specifically, if the first difference value $Z1j$ is smaller than the second difference value $Z2j$, the first predicted value $X1(j+1)$ is selected in the next period $T(j+1)$. On the other hand, if the second difference value $Z2j$ is smaller than the first difference value $Z1j$, the second predicted value $X2(j+1)$ is selected in the next period $T(j+1)$. In other words, the selector 125 selects the predicted value with higher prediction accuracy from among the first predicted value $X1(j-1)$ and the second predicted value $X2(j+1)$.

The requester 127 requests the distribution apparatus 30 to transmit the video with a quality based on the selected result of the selector 125. In a case in which the selected predicted value is small, the requester 127 requests the distribution apparatus 30 to transmit the video with lower quality compared to a quality requested in a case in which the predicted value is large. In a case in which the selected predicted value is large, the requester 127 requests the distribution apparatus 30 to transmit the video with higher quality compared to a quality requested in a case in which the predicted value is small.

The decoder 128 decodes the video data received from the distribution apparatus 30 using the communication apparatus 140. The decoded video data is provided to the output apparatus 160. The display device of the output apparatus 160 displays an image based on the video data and the speaker of the output apparatus 160 outputs a sound based on the video data. In addition, the decoder 128 generates a log L relating to playback of the video for each of the periods T1 to Tn. The transmission controller 129 transmits the logs L generated by the decoder 128 to the server apparatus 20 using the communication apparatus 140.

1-3. Server Apparatus

Figure 6:
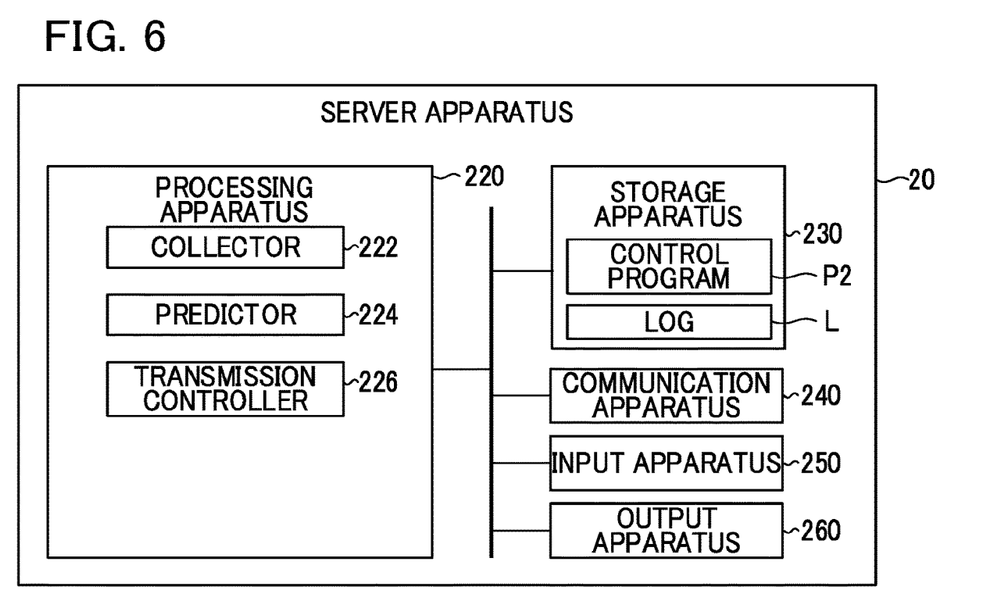
FIG. 6 is a block diagram showing a configuration example of a server apparatus.

FIG. 6 is a block diagram showing a configuration of a server apparatus 20. The server apparatus 20 is constituted of a computer system including a processing apparatus 220, a storage apparatus 230, a communication apparatus 240, an input apparatus 250, and an output apparatus 260. The processing apparatus 220, storage apparatus 230, communication apparatus 240, input apparatus 250, and output apparatus 260 are connected to one another by one or more buses. In addition, each element of the server apparatus 20 is constituted of one or more devices.

The processing apparatus 220 is a processor that controls the entirety of the server apparatus 20, and is constituted of, for example, one or more chips. Like the processing apparatus 120, the processing apparatus 220 is constituted of, for example, a central processing unit (CPU) including an interface with peripheral devices, a computing device, and a register, etc. Some or all of the functions of the processing apparatus 220 may be realized by hardware such as a DSP, an ASIC, a PLD, or a FPGA. The processing apparatus 220 executes various processes in parallel or in sequence.

The storage apparatus 230 is a recording medium readable by the processing apparatus 220. The storage apparatus 230 stores programs including a control program P2 executed by the processing apparatus 220, logs L collected from the information processing apparatus 10, and various data used by the processing apparatus 220. Like the storage apparatus 130, the storage apparatus 230 is constituted of, for example, a non-volatile memory and a volatile memory. The volatile memory included in the storage apparatus 230 is used as a working memory of the processing apparatus 220.

The communication apparatus 240 is a device that communicates with other apparatuses through a network NW such as a mobile communication network or the Internet. Like the communication apparatus 140, the communication apparatus 240 is also referred to as, for example, a network device, a network controller, a network card, or a communication module. The communication apparatus 240 is capable of communicating with the information processing apparatus 10 via the network NW.

The input apparatus 250 is a device for inputting information for using the server apparatus 20. The input apparatus 250 receives an operation input from a user. For example, the input apparatus 250 may be a keyboard, a mouse, etc.

The output apparatus 260, controlled by the processing apparatus 220, notifies the user of various information. The output apparatus 160 includes, for example, a display apparatus and a speaker.

Next, by reading and executing the control program P2 from the storage apparatus 230, the processing apparatus 220 functions as a collector 222, a predictor 224, and a transmission controller 226.

The collector 222 collects logs L from information processing apparatuses 10. One log L is information which associates information on an operation of one information processing apparatus 10 with a time. In addition to information on a type of application being executed by the information processing apparatus 10, a URL of a screen displayed using a web browser, a file upload, a file download, and playback of music, the information on the operation of the information processing apparatus 10 also includes information on playback of a video. The information on playback of the video includes at least one of a resolution, framerate, buffering, and bitrate. The logs collected from one information processing apparatus 10 are stored in the storage apparatus 230 in association with identifying information that identifies the one information processing apparatus 10.

The predictor 224 predicts a throughput of the network NW based on the logs L collected by the collector 222, to generate a second predicted value X2 indicative of the predicted result for each of the information processing apparatuses 10. The greater the number of logs L used in the prediction of the throughput, the higher the prediction accuracy of the throughput by the predictor 224. The predictor 224 corresponds to the second predictor.

The transmission controller 226 causes the communication apparatus 240 to transmit each of the generated second predicted values X2 to a corresponding information processing apparatus 10. In this way, respective second predicted values X2 generated by the server apparatus 20 are notified to respective information processing apparatuses 10. As described above, the information processing apparatus 10 selects the quality of the video based on the predicted value with higher prediction accuracy from among the throughput predicted by the information processing apparatus 10 and the throughput predicted by the server apparatus 20. As a result, the quality of the video is suitably selected according to the communication status of the network NW.

1-4. Distribution Apparatus

Figure 7:
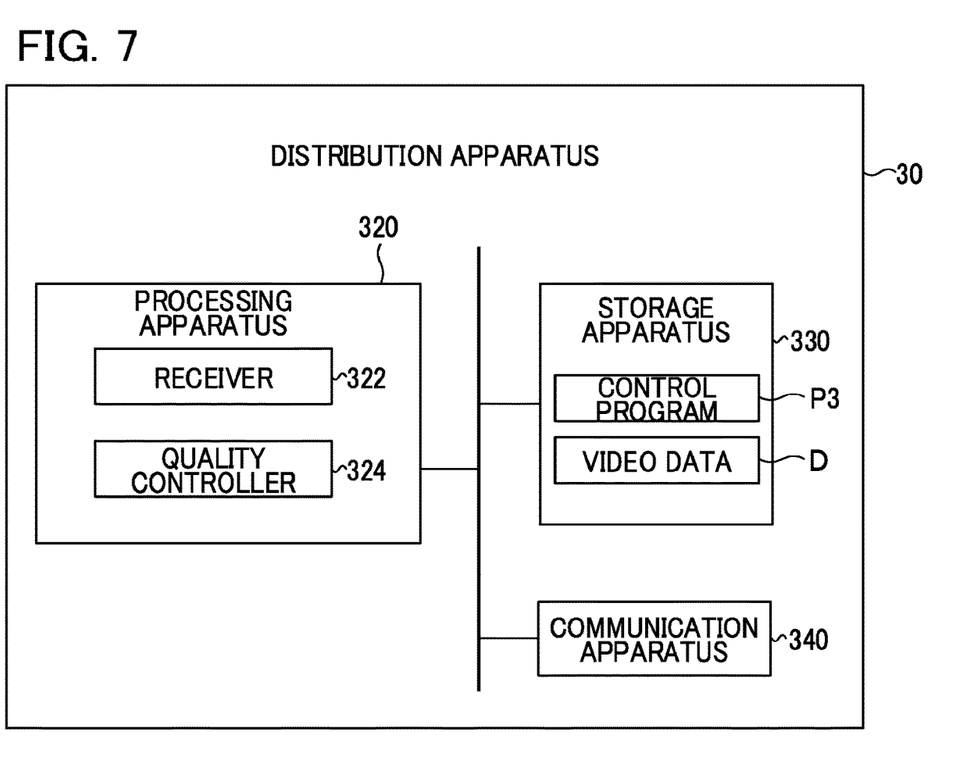
FIG. 7 is a block diagram showing a configuration example of a distribution apparatus.

FIG. 7 is a block diagram showing a configuration of the distribution apparatus 30. The distribution apparatus 30 is constituted of a computer system including a processing apparatus 320, a storage apparatus 330, and a communication apparatus 340. The elements of the distribution apparatus 30 are connected to one another by one or more buses. In addition, each element of the distribution apparatus 30 is constituted of one or more devices.

The processing apparatus 320 is a processor that controls the entirety of the distribution apparatus 30, and is constituted of, for example, one or more chips. Like the processing apparatus 120, the processing apparatus 320 is constituted of, for example, a central processing unit including an interface with peripheral devices, a computing device, and a register, etc. Some or all of the functions of the processing apparatus 320 may be realized by hardware such as a DSP, an ASIC, a PLD, or a FPGA. The processing apparatus 320 executes various processes in parallel or in sequence.

The storage apparatus 330 is a recording medium readable by the processing apparatus 320. The storage apparatus 330 stores programs including a control program P3 executed by the processing apparatus 320, vide data D, and various data used by the processing apparatus 320. Like the storage apparatus 130, the storage apparatus 330 is constituted of, for example, a non-volatile memory and a volatile memory. The volatile memory included in the storage apparatus 330 is used as a working memory of the processing apparatus 320.

The communication apparatus 340 is a device that communicates with other apparatuses through a network NW such as a mobile communication network or the Internet. Like the communication apparatus 140, the communication apparatus 340 is also referred to as, for example, a network device, a network controller, a network card, or a communication module. The communication apparatus 340 is capable of communicating with the information processing apparatus 10 via the network NW.

By reading and executing the control program P3 from the storage apparatus 330, the processing apparatus 320 functions as a receiver 322 and a quality controller 324.

The receiver 322 receives a request including information specifying a video quality, transmitted from the information processing apparatus 10. The quality controller 324 reads video data D from the storage apparatus 330, the video data D corresponding to the request received by the receiver 322. Using the communication apparatus 340, a transmission controller 326 transmits the read video data D to the information processing apparatus 10 where the request originated.

1-5. Operation of Information Processing System

Figure 8:
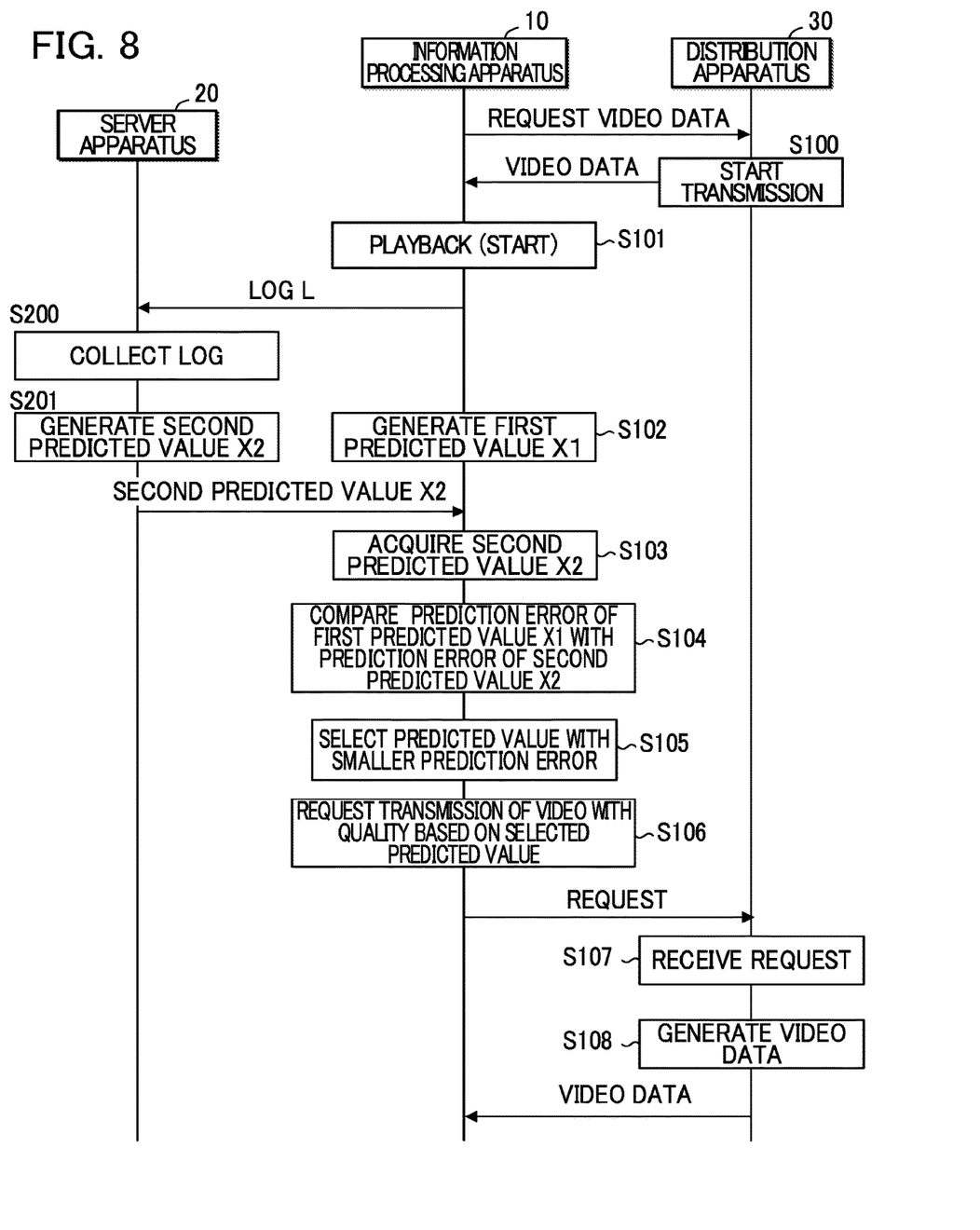
FIG. 8 is a sequence chart showing an operation of the information processing system.

Next, an operation of the information processing system 1 is described. FIG. 8 is a sequence chart explaining the operation of the information processing system 1.

First, the processing apparatus 120 of the information processing apparatus 10 generates a video data request to request the distribution apparatus 30 to transmit video data of a video specified according to an operation input of a user to the input apparatus 150. The transmission controller 129 causes the communication apparatus 140 to transmit the video data request to the distribution apparatus 30.

Next, the distribution apparatus 30, upon receiving the video data request, generates video data of a title specified by the video data request and starts transmission of the video data (Step S100). When the information processing apparatus 10 receives the generated video data, the processing apparatus 120 functions as the decoder 128. The processing apparatus 120 decompresses the received video data and provides the decompressed video data to the input apparatus 150, starting playback of the video (Step S101).

In addition, the decoder 128 generates a log L on video playback for each of a plurality of periods T1 to Tn. The generated log L is transmitted by the communication apparatus 140 to the server apparatus 20 for each of the periods T1 to Tn. Furthermore, the processing apparatus 120 functions as a predictor 122. Specifically, the processing apparatus 120 predicts a throughput of the network NW, to generate a first predicted value X1 indicative of the predicted throughput (Step S102).

In Step S200, the processing apparatus 220 of the server apparatus 20 functions as the collector 222, to collect the logs L for the periods T1 to Tn (i.e., a series of logs L). The collector 222 collects the series of logs L for each of a plurality of information processing apparatuses 10.

In Step S201, the processing apparatus 220 functions as the predictor 224. Specifically, the processing apparatus 220 predicts a throughput of the network NW based on the collected logs L, to generate a second predicted value X2 indicative of the predicted result. The generated second predicted value X2, under the control of the transmission controller 129, is transmitted to the information processing apparatus 10.

Next, the processing apparatus 120 of the information processing apparatus 10 functions as the acquirer 123. Specifically, the processing apparatus 120 acquires the second predicted value X2 (Step S103). Next, the processing apparatus 120 functions as the selector 125. Specifically, the processing apparatus 120 compares a prediction error of the first predicted value X1 with a prediction error of the second predicted value X2 (Step S104). Next, the processing apparatus 120 selects the prediction value with the smaller prediction error from among the first predicted value X1 and the second predicted value X2 (Step S105).

Then, the processing apparatus 120 functions as the requester 127. Specifically, the processing apparatus 120 generates a video data request specifying transmission of a video with quality based on the selected predicted value (Step S106). The video data request is transmitted by the communication apparatus 140 to the distribution apparatus 30.

Next, the processing apparatus 320 of the distribution apparatus 30 functions as the receiver 322. Specifically, the processing apparatus 320 receives the request including information specifying the video quality (Step S107). Next, the processing apparatus 320 functions as the quality controller 324. The processing apparatus 320 reads video data D that corresponds to the received request from the storage apparatus 330, to generate the video data D (Step S108) Then, the read video data D is transmitted to the information processing apparatus 10.

As described above, according to the present embodiment, since the information processing apparatus 10 includes the predictor 122, which predicts a throughput of the network NW to generate the first predicted value X1 indicative of the predicted result, the information processing apparatus 10 itself is able to predict the throughput. In addition, the acquirer 123 of the information processing apparatus 10 acquires, from the server apparatus 20 connected to the network NW, the second predicted value X2 indicative of the throughput of the network NW predicted by the server apparatus 20. The selector 125 selects one of the first predicted value X1 and the second predicted value X2. More specifically, the selector 125 selects the predicted value with higher prediction accuracy from among the first predicted value X1 and the second predicted value X2. Furthermore, the requester 127 requests the distribution apparatus 30 to transmit, to the information processing apparatus 10, a video with quality based on the predicted value selected by the selector 125. Therefore, since the information processing apparatus 10 can select the first predicted value X1 predicted by the information processing apparatus 10 itself and the second predicted value X2 predicted by the server apparatus 20, prediction accuracy of the throughput of the network NW is improved compared to a case in which there are no options. As a result, the information processing apparatus 10 can suitably select video quality according to the communication status of the network.

In addition, the selector 125 compares a prediction error of the first predicted value X1 with a prediction error of the second predicted value X2, and selects the predicted value with the smaller prediction error. It is therefore possible to specify the video quality using the predicted value with the higher prediction accuracy from among the first predicted value X1 and the second predicted value X2.

More specifically, the information processing apparatus 10 includes the calculator 124, which calculates the throughput of the network NW when video data is received in each of the periods T1 to Tn, to generate the measured value Y indicative of the calculated results. Then, the predictor 122 predicts the first predicted value X1 in each of the periods T1 to Tn, and the server apparatus 20 predicts the second predicted value X2 in each of the periods T1 to Tn. Based on the result of the comparison of the first difference value Z1$j$, indicative of the difference between the first predicted value X1$j$ and the measured value Yj in one period Tj of the periods T1 to Tn, with the second difference value Z2$j$, indicative of the difference between the second predicted value X2$j$ and the measured value Yj in one period Tj, the selector 125 selects one of the first predicted value X1($j$+1) or second predicted value X2($j$+1) in the next (immediately following) period T($j$+1) (second period) after the period Tj (first period).

In addition, the server apparatus 20 includes the collector 222, which collects a plurality of logs L from the information processing apparatus 10, each log L containing information on video playback, the predictor 224, which predicts a throughput of the network NW based on the logs L collected by the collector 222, to generate the predicted value indicative of the predicted result, and the transmission controller 226, which causes the communication apparatus 240 to transmit the generated predicted value to the information processing apparatus 10. The predicted value generated by the server apparatus 20 is the second predicted value X2. The second predicted value X2 generated by the server apparatus 20 is generated based on the logs L, each log L containing information on video playback. Prediction is thus carried out from a different point of view than the throughput of the network NW that is calculated by the calculator 124 of the information processing apparatus 10. Since the information processing apparatus 10 is able to select a predicted value with higher prediction accuracy from among the first predicted value X1 and the second predicted value X2 generated from different viewpoints, video quality can be suitably selected based on the communication status of the network NW.

2. Modifications

Specific modifications of the aspects described above are described below. Two or more aspects freely selected from the example descriptions below may be appropriately combined within a scope in which they do not conflict with each other.

2-1. First Modification

In a case in which the selector 125 of the information processing apparatus 10 has selected the second predicted value X2 for a predetermined number of consecutive periods of the periods T1 to Tn, the second predicted value X2 may be selected in the period immediately following the last period of the consecutive periods. Here, the predetermined number is an integer greater than or equal to 2. The second predicted value X2 is generated by the server apparatus 20 based on logs L, each log L containing information on video playback. Therefore, as the number of logs L increases, the prediction accuracy of the second predicted value X2 improves. As such, when the second predicted value X2 is selected in a period, it is highly probable that the second predicted value X2 will be selected in the next period. According to the first modification, after the selector 125 has selected the second predicted value X2 for a predetermined number of consecutive periods, the selector 125 no longer needs to compare the prediction error of the first predicted value X1 with the prediction error of the second predicted value X2, which allows for reducing the processing load of the processing apparatus 120. In a case in which the selector 125 has selected the second predicted value X2 for a predetermined number of consecutive periods, the second predicted value X2 is selected in the next period while omitting the comparison of the prediction errors. In other words, at the point in time when the selector 125 has selected the second predicted value X2 for a predetermined number of consecutive periods, the prediction accuracy of the second predicted value X2 has sufficiently improved. Therefore, in the following period, the selector 125 determines that, from among the first predicted value X1 and the second predicted value X2, the prediction accuracy of the second predicted value X2 is higher, and selects the second predicted value X2.

2-2. Second Modification

The selector 125 of the information processing apparatus 10 may, depending on a reliability (degree of reliability) of the second predicted value X2, use a different method of selecting the first predicted value X1 or the second predicted value X2. In the second modification, the acquirer 123 of the information processing apparatus 10 acquires the reliability of the second predicted value X2 from the server apparatus 20. In a case in which the reliability is lower than a predetermined value, the selector 125 compares the prediction error of the first predicted value X1 with the prediction error of the second predicted value X2, and selects the predicted value with the smaller prediction error. In a case in which the reliability is greater than or equal to the predetermined value, the selector 125 selects the second predicted value X2. According to the second modification, in a case in which the reliability of the second predicted value X2 is greater than or equal to the predetermined value, there is no need to compare the prediction error of the first predicted value X1 with the prediction error of the second predicted value X2, which allows for reducing the processing load of the processing apparatus 120.

2-3. Third Modification

The selector 125 of the information processing apparatus 10 may select one of the first predicted value X1 and the second predicted value X2, depending on reliability of the second predicted value X2. For example, in a case in which the reliability of the second predicted value X2 is greater than or equal to a predetermined value, the selector 125 may select the second predicted value X2, and in a case in which the reliability of the second predicted value X2 is lower than the predetermined value, the selector 125 may select the first predicted value X1. According to the third modification, there is no need to compare the prediction error of the first predicted value X1 with the prediction error of the second predicted value X2, which allows for reducing the processing load of the processing apparatus 120.

2-4. Fourth Modification

The predictor 224 of the server apparatus 20 may generate a predicted value (second predicted value X2) for one information processing apparatus 10 based on one or more logs L collected from the one information processing apparatus 10 and one or more logs L collected from another information processing apparatus 10. The predictor 224 of the server apparatus 20 may also calculate a reliability of the second predicted value X2 according to the number of logs L used in the generation of the predicted value (second predicted value X2). In this case, the number of logs L may be the number of logs L collected from one information processing apparatus 10, or may be the number of logs L collected from a plurality of information processing apparatuses 10. The transmission controller 226 causes the communication apparatus 240 to transmit the predicted value (second predicted value X2) and the reliability to the information processing apparatus 10. The selector 125 of the information processing apparatus 10 that has received the second predicted value X2 and the reliability selects either the first predicted value X1 or the second predicted value X2 using, for example, the methods described in the second modification or third modification above.

In addition, the predictor 224 may predict the throughput of the network NW based on the logs L collected by the collector 222, calculate a reliability of the throughput based on the number of logs L used in the prediction of the throughput, and generate the predicted value (second predicted value X2) by correcting the predicted throughput using the calculated reliability. For example, in a case in which the reliability is low, the predictor 224 corrects the predicted value (second predicted value X2) to be smaller compared to a case in which the reliability is high. Due to this correction, even if the selector 125 of the information processing apparatus 10 has selected the second predicted value X2 in a case in which the reliability of the second predicted value X2 is low, the requester 127 will not request a video of high quality from the distribution apparatus 30. It is thus possible to avoid major failure in playback of the video in the information processing apparatus 10.

2-5. Fifth Modification

The predictor 224 of the server apparatus 20 may calculate the reliability of the predicted value (second predicted value X2) based on a statistic. Specifically, the collector 222 according to the fifth modification collects a plurality of logs L from each of a plurality of information processing apparatuses 10. The predictor 224 predicts the throughput of the network NW for each of the information processing apparatuses 10 based on the logs L collected from each of the information processing apparatuses 10. The predictor 224 sets a throughput corresponding to each of the respective information processing apparatuses 10 as a predicted value (second predicted value X2) corresponding to the information processing apparatus 10. In addition, the predictor 224 calculates a statistic based on throughputs for the information processing apparatuses 10. A preferable statistic is, for example, variance. Alternatively, the statistic may be a standard deviation or a difference between a maximum and minimum values. Furthermore, the predictor 224 calculates one reliability corresponding to the plurality of predicted values (second predicted value X2) based on the calculated statistic. For example, in a case in which the statistic is variance, the reliability is low when the variance is large, and the reliability is high when the variance is small. The transmission controller 226 causes the communication apparatus 240 to transmit each of the predicted values (second predicted value X2) and the reliability to the corresponding information processing apparatus 10. The selector 125 of the information processing apparatus 10 that has received the second predicted value X2 and the reliability selects either the first predicted value X1 or the second predicted value X2 using, for example, the methods described in the second modification or third modification above.

In addition, the predictor 224 may generate corrected predicted values as predicted values (second predicted value X2) of the information processing apparatuses 10 by correcting the throughputs predicted for the information processing apparatuses 10 based on the calculated reliability. In other words, the predictor 224 generates corrected second predicted values X2 for the respective information processing apparatuses 10. The transmission controller 226 causes the communication apparatus 240 to transmit each of the corrected predicted values (second predicted value X2) to the corresponding information processing apparatus 10. Due to this correction, even if the selector 125 of the information processing apparatus 10 has selected the second predicted value X2 in a case in which the reliability of the second predicted value X2 is low, the requester 127 will not request a video of high quality from the distribution apparatus 30. It is thus possible to avoid major failure in playback of the video in the information processing apparatus 10.

2-6. Sixth Modification

The predictor 224 of the server apparatus 20 may acquire quality information indicative of communication quality of a base station serving one information processing apparatus 10, to calculate the predicted value (second predicted value X2) using the acquired quality information and the logs L.

The collector 222 according to the sixth modification collects quality information indicative of communication quality of each of a plurality of base stations (not shown) included in the network NW. The predictor 224 calculates the second predicted value X2 based on, from among pieces of quality information, a piece of quality information that corresponds to a base station serving one information processing apparatus 10 and logs L corresponding to the one information processing apparatus 10. Since the communication quality (throughput, etc.) of the base station is also used in the prediction of the throughput of the network NW, the prediction accuracy of the predicted value (second predicted value X2) can be improved.

2-7. Seventh Modification

In the embodiment described above, the process of selecting either the first predicted value X1 or the second predicted value X2 is executed by the information processing apparatus 10, but this process may also be executed by the server apparatus 20.

3. Other Matters (1) In each of the embodiment and the first to seventh modifications, the storage apparatuses 130, 230, and 330 may include a flexible disk, a magnetooptical disc (for example, a compact disc, a digital versatile disc, or a Blu-ray (registered trademark) disc), a smart card, a flash memory device (for example, a card, a stick, or a key drive), a compact disc-ROM (CD-ROM), a register, a removable disk, a hard disk, a Floppy (registered trademark) disk, a magnetic strip, a database, a server, or other suitable computer-readable recording medium. In addition, the programs may be transmitted from the network via a telecommunication line.

(2) Each of the embodiment and the first to seventh modifications may be applied to systems utilizing Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wideband (UWB), Bluetooth (registered trademark), or other suitable systems, and/or next-generation systems that are expanded based on these systems.

(3) The information, etc., described in each of the embodiment and the first to seventh modifications may be expressed using any different technologies. For example, any data, information, bits, chips, etc., mentioned throughout the entirety of the above description may be expressed by voltage, current, electromagnetic waves, magnetic fields or magnetic particles, optical fields or photons, or any combination thereof. Furthermore, the terms described in this description and/or terms needed to understand this description may be replaced with terms having the same or similar meanings.

(4) In the first embodiment and the first to seventh modifications, input information, etc., may be stored in a specific location (for example, a memory), and may be managed by a management table. Input/Output information, etc., may be overwritten, updated, or added. Output information, etc., may also be deleted. Input information etc., may be transmitted to other apparatuses.

(5) In the embodiment and the first to seventh modifications, determinations may be performed by a value represented by one bit (0 or 1), a true-false value (Boolean: true or false), or by comparison of values (for example, comparison with a predetermined value).

(6) The order of the processes, sequences, flowcharts, etc., described in each of the embodiment and the first to seventh modifications may be changed so long as no conflicts arise. For example, with regard to the methods described in the present description, elements of various steps are presented in an exemplary order, but they are not limited to the specific order presented.

(7) The functions shown in FIGS. 3, 6, and 7 are realized by any combination of hardware and software. Furthermore, each function may be realized by a single apparatus, or by two or more mutually separately configured apparatuses.

(8) Regardless of whether the programs described in each of the embodiment and the first to seventh modifications should be referred to as software, firmware, middleware, microcode or hardware description language, or by another name, they should be broadly interpreted as meaning instructions, instruction sets, code, code segments, program code, subprograms, software modules, applications, software applications, software packages, routines, subroutines, objects, executable files, threads of execution, procedures or functions, etc. Furthermore, software, instructions, etc., may be transmitted via a transmission medium. For example, in a case in which software is transmitted from a website, server, or other remote source using wired technology such as a coaxial cable, a fiber-optic cable, a twisted pair cable, and a digital subscriber line (DSL), or wireless technology such as infrared light, radio or microwaves, etc., these wired/wireless technologies are included in the definition of a transmission medium.

(9) In each of the embodiment and the first to seventh modifications, the terms "system" and "network" are used interchangeably.

(10) Each of the embodiment and the first to seventh modifications include a case in which the information processing apparatus 10 is a mobile station. One skilled in the art may refer to a mobile station as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a hand set, a user agent, a mobile client, a client, or a number of other suitable terms.

(11) The term "determining" as used in the present description may include a variety of different operations. For example, something that has been judged, calculated, computed, processed, derived, investigated, looked up (for example, in a search of a table, database, or other data construct), or ascertained, may be considered to have been "determined." In addition, something that has been received (for example, received information), transmitted (for example, transmitted information), input, output, or accessed (for example, accessed data in a memory), may be considered to have been "determined."
In addition, something that has been resolved, selected, chosen, established, or compared may be considered to have been "determined." In other words, "determine" may include anything that can be considered to have "determined" some kind of operation.

(12) In each of the embodiment and the first to seventh modifications, the description "based on" does not mean "based solely on" unless it is explicitly stated otherwise. In other words, the description "based on" includes both "based solely on" and "based at least on."

(13) Any reference to elements using the designations "first," "second," etc., used in the present description does not generally limit the quantity or order of those elements. These designations may be used as a convenient way to differentiate between two or more elements in the present description. Accordingly, a reference to a first and a second element does not mean that only two elements may be employed or that the first element must precede the second element in some form.

(14) In each of the embodiment and the first to seventh modifications, the terms "including," "comprising," and variations thereof are meant to be open-ended insofar as they are used in the present description or scope of claims. Furthermore, the term "or" as used in the present description or scope of claims is not meant to be the exclusive OR.

(15) Throughout the entirety of the present Application, in a case in which an article is added in the translation, for example, "a," "an," or "the" in English, these articles include plural forms, unless it is clearly indicated by the context that they do not.

(16) It will be obvious to one skilled in the art that the present invention is not limited to the embodiments described in the present description. The present invention can be implemented with various changes and with various modifications, without departing from the spirit and scope of the present invention defined by the descriptions in the scope of claims. Accordingly, the present description is intended to be exemplary, and does not limit the present invention in any way. In addition, several aspects selected from the exemplary aspects of the present description may be combined.

DESCRIPTION OF REFERENCE SIGNS

1 Information processing system
10 Information processing apparatus
20 Server apparatus
30 Distribution apparatus
120, 220, 320 Processing apparatus
122 Predictor
123 Acquirer
124 Calculator
125 Selector
127 Requester
129, 226, 326 Transmission controller
222 Collector
224 Predictor
X1 First predicted value
X2 Second predicted value
Y Measured value
Z1$j$ First difference value
Z2$j$ Second difference value

The invention claimed is:
1. An information processing apparatus that receives a video transmitted by a distribution apparatus via a network, the information processing apparatus comprising:
processing circuitry configured to
predict a throughput of the network, to generate a first predicted value indicative of the predicted throughput;
acquire, from a server apparatus connected to the network, a second predicted value indicative of a throughput of the network predicted by the server apparatus;
select a predicted value with higher prediction accuracy from among the first predicted value and the second predicted value; and
request the distribution apparatus to transmit a video with a quality based on the selected predicted value, wherein the processing circuitry is configured to compare a prediction error of the first predicted value relative to a measured value of the throughput of the network with a prediction error of the second predicted value relative to the measured value, to select a predicted value with a smaller prediction error, wherein the video is transmitted in each of a plurality of periods with the quality requested by the requester, the processing circuitry is further configured to calculate, in each of the plurality of periods, a throughput of the network when the information processing apparatus receives the video, to generate a measured value indicative of the calculated throughput, and predict the first predicted value in each of the plurality of periods, the server apparatus is configured to predict the second predicted value in each of the plurality of periods, and the processing circuitry is configured to, based on a result of a comparison of a first difference value with a second difference value, select one of the first predicted value and the second predicted value in a second period immediately following a first period of the plurality of periods, the first difference value being indicative of a difference between the first predicted value in the first period and the measured value in the first period, and the second difference value being indicative of a difference between the second predicted value in the first period and the measured value in the first period, wherein, in a case in which the second predicted value is selected for a predetermined number of consecutive periods of the plurality of periods, the processing circuitry is configured to select the second predicted value in a period immediately following a last period of the consecutive periods.

2. An information processing apparatus that receives a video transmitted by a distribution apparatus via a network, the information processing apparatus comprising:

processing circuitry configured to predict a throughput of the network, to generate a first predicted value indicative of the predicted throughput;

acquire, from a server apparatus connected to the network, a second predicted value indicative of a throughput of the network predicted by the server apparatus;

select a predicted value with higher prediction accuracy from among the first predicted value and the second predicted value; and request the distribution apparatus to transmit a video with a quality based on the selected predicted value, wherein the processing circuitry is configured to compare a prediction error of the first predicted value relative to a measured value of the throughput of the network with a prediction error of the second predicted value relative to the measured value, to select a predicted value with a smaller prediction error, acquire a reliability of the second predicted value from the server apparatus, in a case in which the reliability is less than a predetermined value, compare the prediction error of the first predicted value with the prediction error of the second predicted value, to select either the first or the second predicted value with a smaller prediction error, and in a case in which the reliability is greater than or equal to the predetermined value, select the second predicted value.

3. An information processing system comprising:

an information processing apparatus configured to receive a video transmitted by a distribution apparatus via a network; and a server apparatus connected to the information processing apparatus via the network, wherein the information processing apparatus includes processing circuitry configured to:

predict a throughput of the network, to generate a first predicted value indicative of the predicted throughput;

acquire, from the server apparatus, a second predicted value indicative of a throughput of the network predicted by the server apparatus;

select a predicted value with higher prediction accuracy from among the first predicted value and the second predicted value; and request the distribution apparatus to transmit a video with a quality based on the selected predicted value, and wherein the server apparatus includes processing circuitry configured to:

collect a plurality of logs from the information processing apparatus, each log including information on playback of the video;

predict the second predicted value based on the plurality of logs; and cause a communication apparatus to transmit the second predicted value to the information processing apparatus, wherein the processing circuitry of the information processing apparatus is configured to compare a prediction error of the first predicted value relative to a measured value of the throughput of the network with a prediction error of the second predicted value relative to the measured value, to select a predicted value with a smaller prediction error, acquire a reliability of the second predicted value from the server apparatus, in a case in which the reliability is less than a predetermined value, compare the prediction error of the first predicted value with the prediction error of the second predicted value, to select either the first or the second predicted value with a smaller prediction error, and in a case in which the reliability is greater than or equal to the predetermined value, select the second predicted value.

\* \* \* \* \*